(12) United States Patent
Lu et al.

(10) Patent No.: US 9,461,311 B2
(45) Date of Patent: *Oct. 4, 2016

(54) MICROPOROUS LAYER FOR A FUEL CELL

(71) Applicant: Ford Global Technologies, LLC, Dearborn, MI (US)

(72) Inventors: Zijie Lu, Novi, MI (US); James Waldecker, Plymouth, MI (US); Michael Allen Debolt, Saline, MI (US); Donald Paul Alessi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

This patent is subject to a terminal disclaimer.

(21) Appl. No.: 13/832,358

(22) Filed: Mar. 15, 2013

(65) Prior Publication Data
US 2014/0272664 A1 Sep. 18, 2014

(51) Int. Cl.
*H01M 4/86* (2006.01)
*H01M 8/02* (2016.01)
*H01M 8/10* (2016.01)

(52) U.S. Cl.
CPC ............ *H01M 4/8626* (2013.01); *H01M 4/861* (2013.01); *H01M 8/0234* (2013.01); *H01M 8/0243* (2013.01); *H01M 2008/1095* (2013.01); *Y02E 60/50* (2013.01); *Y02E 60/521* (2013.01)

(58) Field of Classification Search
CPC ............. H01M 4/8626; H01M 4/486; H01M 4/8605; H01M 8/1002; H01M 8/0241–8/0245; H01M 8/023; H01M 8/0247; H01M 4/861; H01M 8/0234; H01M 8/0243; H01M 2008/1095; Y02E 60/521; Y02E 60/50
See application file for complete search history.

(56) References Cited

U.S. PATENT DOCUMENTS

| 4,038,463 A | 7/1977 | Lamarine et al. |
|---|---|---|
| 5,238,613 A | 8/1993 | Anderson |

(Continued)

FOREIGN PATENT DOCUMENTS

| JP | 2007323975 A | 12/2007 |
|---|---|---|
| JP | 2010061966 A | 3/2010 |

(Continued)

OTHER PUBLICATIONS

Johan Ko, Whan-Gi Kim, Young-Don Lim, Hyunchul Ju, Improving the cold-start capability of polymer electrolyte fuel cells (PEFCs) by using a dual-function micro-porous layer (MPL): Numerical simulations, International Journal of Hydrogen Energy, vol. 38, Issue 1, Jan. 11, 2013, pp. 652-659.*

(Continued)

*Primary Examiner* — Nicholas P D'Aniello
*Assistant Examiner* — Philip A Stuckey
(74) *Attorney, Agent, or Firm* — Damian Porcari; Brooks Kushman P.C.

(57) ABSTRACT

In at least one embodiment, a fuel cell is provided comprising a positive electrode including a first gas diffusion layer and a first catalyst layer, a negative electrode including a second gas diffusion layer and a second catalyst layer, a proton exchange membrane (PEM) disposed between the positive and negative electrodes, and a microporous layer of carbon and binder disposed between at least one of the first gas diffusion layer and the first catalyst layer and the second gas diffusion layer and the second catalyst layer. The microporous layer may have defined therein a plurality of pores with a diameter of 0.05 to 2.0 μm and a plurality of bores having a diameter of 1 to 100 μm. The bores may be laser perforated and comprise from 0.1 to 5 percent of a total porosity of the microporous layer.

19 Claims, 2 Drawing Sheets

(56) References Cited

U.S. PATENT DOCUMENTS

| | | | |
|---|---|---|---|
| 7,862,956 | B2 | 1/2011 | Johnston et al. |
| 7,923,172 | B2 | 4/2011 | De Castro et al. |
| 8,187,764 | B2 | 5/2012 | Kim et al. |
| 8,197,983 | B2 | 6/2012 | Cha et al. |
| 8,283,081 | B2 | 10/2012 | Huth et al. |
| 8,945,790 | B2 * | 2/2015 | Lu et al. ............... 429/480 |
| 2004/0001988 | A1 * | 1/2004 | Yazici ............... H01M 4/8605 |
| | | | 429/481 |
| 2006/0199061 | A1 | 9/2006 | Fiebig et al. |
| 2006/0228606 | A1 | 10/2006 | Fiebig et al. |
| 2007/0099068 | A1 | 5/2007 | Suzuki et al. |
| 2008/0241623 | A1 | 10/2008 | Mossman et al. |
| 2010/0092811 | A1 | 4/2010 | Badrinarayanan |
| 2010/0167099 | A1 * | 7/2010 | Sung et al. ............... 429/30 |
| 2010/0227244 | A1 | 9/2010 | Song et al. |
| 2010/0305217 | A1 | 12/2010 | Qiu et al. |
| 2011/0097639 | A1 | 4/2011 | Darling et al. |
| 2011/0151352 | A1 | 6/2011 | Wilde et al. |
| 2011/0183232 | A1 | 7/2011 | Tsou et al. |
| 2011/0207022 | A1 | 8/2011 | Wieser et al. |
| 2011/0229823 | A1 | 9/2011 | Rock et al. |
| 2011/0244359 | A1 * | 10/2011 | Ueda ............... 429/480 |
| 2012/0034548 | A1 | 2/2012 | Okuyama et al. |
| 2012/0141902 | A1 | 6/2012 | Hong et al. |
| 2012/0156587 | A1 * | 6/2012 | Akasaka et al. ............... 429/480 |

FOREIGN PATENT DOCUMENTS

| | | |
|---|---|---|
| TW | 200830611 | 7/2008 |
| WO | 2009120976 | 10/2009 |
| WO | 2010132050 A1 | 11/2010 |
| WO | 2011149442 A1 | 12/2011 |
| WO | 2013103338 A1 | 7/2013 |

OTHER PUBLICATIONS

D. Gerteisen, T. Heilmann, C. Ziegler, Enhancing liquid water transport by laser perforation of a GDL in a PEM fuel cell, Journal of Power Sources, vol. 177, Issue 2, Mar. 1, 2008, pp. 348-354.*

M.P. Manahan, M.C. Hatzell, E.C. Kumbur, M.M. Mench, Laser perforated fuel cell diffusion media. Part I: Related changes in performance and water content, Journal of Power Sources, vol. 196, Issue 13, Jul. 1, 2011, pp. 5573-5582.*

R. Alink, J. Haußmann, H. Markötter, M. Schwager, I. Manke, D. Gerteisen, The influence of porous transport layer modifications on the water management in polymer electrolyte membrane fuel cells, Journal of Power Sources, vol. 233, Jul. 1, 2013.*

Ahmad El-kharouf, Thomas J. Mason, Dan J.L. Brett, Bruno G. Pollet, Ex-situ characterisation of gas diffusion layers for proton exchange membrane fuel cells, Journal of Power Sources, vol. 218, Nov. 15, 2012, pp. 393-404.*

SIGRACET® GDL 24 & 25 Series Gas Diffusion Layer by SGL Group. Apr. 2007. Accessed from http://www.ion-power.com/res/Sigracet/GDL_24_25_Series_07.pdf on Apr. 16, 2015.*

Mukundan, Rangachary [Los Alamos National Laboratory] et al. "Effect of Hydrophilic Treatment of Microporous Layer on Fuel Cell Performance." United States: N. p., 2010. Web. accessed from http://permalink.lanl.gov/object/tr?what=info:lanl-repo/lareport/LA-UR-10-04632 on May 11, 2015.*

Rangachary Mukundan, John Davey, Joseph D. Fairweather, Dusan Spernjak, Jacob S. Spendelow, Daniel S. Hussey, David Jacobson, Peter Wilde, Ruediger Schweiss, and Rodney L. Borup. Effect of Hydrophilic Treatment of Microporous Layer on Fuel Cell Performance. ECS Trans. 2010 33(1): 1109-1114.*

Chang Sun Kong, Do-Young Kim, Han-Kyu Lee, Yong-Gun Shul, Tae-Hee Lee, Influence of pore-size distribution of diffusion layer on mass-transport problems of proton exchange membrane fuel cells, Journal of Power Sources, vol. 108, Issues 1-2, Jun. 1, 2002, pp. 185-191.*

Ko, J., et al., Improving the cold-start capability of polymer electrolyte fuel cells (PEFCs) by using a dual-function microporous layer (MPL): Numerical simulations, sciencedirect.com, 2011, one page, Korea, <http://www.sciencedirect.com/science/article/pii/S0360319912013729>.

Mukundan, R., et al., Effect of Hydrophilic Treatment of Microporous Layer on Fuel Cell Performance, ecst.ecsdl.org, 2010, one page, <http:ecst.ecsdl.org/content/33/1/1109.abstract>.

Weber, A., Effects of Microporous Layers in Polymer Electrolyte Fuel Cells, Journal of the Electrochemical Society, 152 (4) A677-A688 (2005) California.

Mittelsteadt, Cortney et al., Dimensionally Stable High Performance Membrane (SBIR Phase III), Giner Electrochemical Systems, LLC (GES) FY 2011 Annual Progress Report, Oct. 1, 2010, pp. 671-674, Giner Electrochemical Systems, LLC, Newton, MA, USA.

H. Chraibi et al., Influence of Wettability on Liquid Water Transport in Gas Diffusion Layer of Proton Exchange Membrane Fuel Cells (PEMFC), Institut de Mecanique des Fluides de Toulouse, UMR CNRS-INP/UPS No. 5502, 7 pages, Toulouse and Gif-Sur-Yvette, France.

U.S. Department of Energy, "Fuel Cell Technologies Program Multi-Year Research, Development and Demonstration Plan," Section 3.4—Fuel Cells, Oct. 2007. (http://www1.eere.energy.gov/hydrogenandfuelcells/mypp/pdfs/fuel_cells.pdf).

Kandlikar, S G et al., "Fundamental Research Needs in Combined Water and Thermal Management Within a Proton Exchange Membrane Fuel Cell Stack Under Normal and Cold-Start Conditions," J Fuel Cell Sci Technol 2009; 6: 044001-1-13.

Owejan, J P et al., "Water management studies in PEM fuel cells, Part I: Fuel cell design and in situ water distributions," Int J Hydrogen Energy 2009; 34:3436-44.

Anderson, R. et al., "A critical review of two phase flow in gas flow channels of proton exchange membrane fuel cells," J Power Sources 2010; 195:4531-53.

Cindrella, L. et al., "Gas diffusion layer for proton exchange membrane fuel cells—A review," J. Power Sources, 194, 146-160 (2009).

Qi, Z. et al., Improvement of water management by a microporous sublayer for PEM fuel cells,: J. Power Sources, 109, 38-46 (2002).

Lin, G.Y. et al. "A two-dimensional two-phase model of a PEM fuel cell," J. Electrochem. Soc., 153, A372-A382 (2006).

Gostick, J.T. et al "On the role of the microporous layer in PEMFC operation," Electrochem. Commun., 11, 576-579 (2009).

Lu, Z. et al., "Water management studies in Pem fuel cells, Part III: dynamic breakthrough and intermittent drainage characteristics from GDLs with and without MPLs," Int. J. Hydrogen Energy, 35, 4222-4233 (2010).

* cited by examiner

MICROPOROUS LAYER FOR A FUEL CELL

TECHNICAL FIELD

One or more embodiments relate to a microporous layer for a fuel cell.

BACKGROUND

Concerns about environmental pollution and fossil fuel depletion have led to urgent demand for alternative clean energy solutions. The hydrogen fuel cell, for example, the proton exchange membrane fuel cell (PEMFC), is one potential energy conversion system for future automobiles and stationary applications. The reaction in a PEMFC involves hydrogen molecules splitting into hydrogen ions and electrons at the anode, while protons re-combine with oxygen and electrons to form water and release heat at the cathode. A fuel cell can be very complicated and delicate due to the specific requirements of high power output (fast reaction and dynamics), longevity, and economical effectiveness. Generally, a proton exchange membrane (PEM) is used as a proton conductor in a PEMFC. A catalyst layer (CL) containing, for example, platinum and/or platinum alloy is used to catalyze the electrode reactions. A gas diffusion medium, which may include a microporous layer (MPL) and a carbon fiber based gas diffusion layer (GDL), is used to transport reactant gases and electrons as well as remove product water and heat. In addition, a flow field plate is generally used to distribute the reactant gas.

SUMMARY

In at least one embodiment, a fuel cell microporous layer is provided comprising a layer of carbon and binder configured to be disposed between a catalyst layer and a gas diffusion layer of a fuel cell electrode. The microporous layer may have a plurality of pores with a diameter of 0.05 to 2.0 µm and a plurality of bores having a diameter of 1 to 100 µm. The bores may comprise from 0.1 to 5 percent of a total porosity of the microporous layer.

In one embodiment, the pores are more hydrophobic than the bores. In another embodiment, the plurality of bores have a transverse spacing therebetween of 0.2 to 3 mm. An areal density of the bores may be from 5 to 500 bores per $cm^2$. The areal density of the bores may increase along a length of the microporous layer. In one embodiment, the bores are laser perforated bores. In another embodiment, the diameter of the bores is a function of a capillary pressure of the gas diffusion layer. In one embodiment, the plurality of pores has a diameter of 0.05 to 0.5 µm and the plurality of bores has a diameter of 1 to 50 µm and comprises from 0.5 to 1.5 percent of the total porosity of the microporous layer.

In at least one embodiment, a fuel cell is provided comprising a positive electrode including a first gas diffusion layer and a first catalyst layer, a negative electrode including a second gas diffusion layer and a second catalyst layer, a proton exchange membrane (PEM) disposed between the positive and negative electrodes, and a microporous layer of carbon and binder disposed between at least one of the first gas diffusion layer and the first catalyst layer and the second gas diffusion layer and the second catalyst layer. The microporous layer may have defined therein a plurality of pores with a diameter of 0.05 to 2.0 µm and a plurality of bores having a diameter of 1 to 100 µm and comprising from 0.1 to 5 percent of a total porosity of the microporous layer.

In one embodiment, a microporous layer is disposed between the first gas diffusion layer and the first catalyst layer and between the second gas diffusion layer and the second catalyst layer. In another embodiment, the pores are more hydrophobic than the bores. The plurality of bores may have a transverse spacing therebetween of 0.2 to 3 mm. In one embodiment, an areal density of the bores is from 5 to 500 bores per cm2. The areal density of the bores may be non-uniform along a length of the microporous layer. The areal density may also be higher in a region of the microporous layer adjacent to a gas channel exit compared to a region of the microporous layer adjacent to a gas channel inlet. The bores may be laser perforated bores. In another embodiment, the diameter of the bores is a function of a capillary pressure of one of the first gas diffusion layer and the second gas diffusion layer. The diameter of the bores, in one embodiment, is a function of a capillary pressure of the second gas diffusion layer. In one embodiment, the plurality of pores has a diameter of 0.05 to 0.5 µm and the plurality of bores has a diameter of 1 to 50 µm and comprises from 0.5 to 1.5 percent of the total porosity of the microporous layer.

In at least one embodiment, a fuel cell microporous layer is provided comprising a bulk material, a plurality of pores defined in the bulk material and having a diameter of 0.05 to 2.0 µm, and a plurality of bores defined in the bulk material and having a diameter of 1 to 100 µm and comprising from 0.1 to 5 percent of a total porosity of the microporous layer.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ embodiments of the present invention.

Although proton exchange membrane fuel cell (PEMFC) technology has undergone significant development over the past decade, a PEMFC with high performance and increased robustness at a low cost has yet to be achieved. Therefore, fuel cells are yet to be significantly commercialized. One of the important technical challenges of PEMFCs is water management. This is mainly dictated by the current polymer electrolyte membrane, which exhibits high proton conductivity only in the well hydrated state. The hydration requirement of the electrolyte limits the maximum fuel cell operating temperature to about 80° C. Above this temperature, membrane dry-out may occur, resulting in decreased proton conductivity. On the other hand, if the product water is not removed efficiently, it may cause water accumulation and flood the electrodes. This may result in a voltage loss from the added resistance to reactant mass transport. Flooding often occurs when the fuel cell operates at lower temperatures and/or higher current densities. At low temperatures, vapor pressure decreases, which makes it more likely that the water vapor partial pressure will exceed the saturation vapor pressure and cause water to condense inside the electrodes and block gas diffusion in the GDLs and catalyst layers. Since the water level in a fuel cell strongly affects not only the membrane properties, but also reactant transport and electrode reaction kinetics, maintaining optimal water balance between the anode and cathode an important factor in achieving higher levels of cell performance.

The liquid water in a fuel cell comes primarily from two sources: water produced by the oxygen reduction reaction at the cathode, and water condensing from humidified gas feeds as reactants are consumed and the vapor pressure exceeds saturation pressure. Liquid water accumulation in various fuel cell components makes two-phase flow (e.g. liquid and gas) almost unavoidable for PEMFC operation, especially at low temperatures and high current densities. The capability to efficiently handle liquid-gas two-phase flow is therefore an important criterion when designing and selecting PEMFC components and operating conditions.

Figure 1:
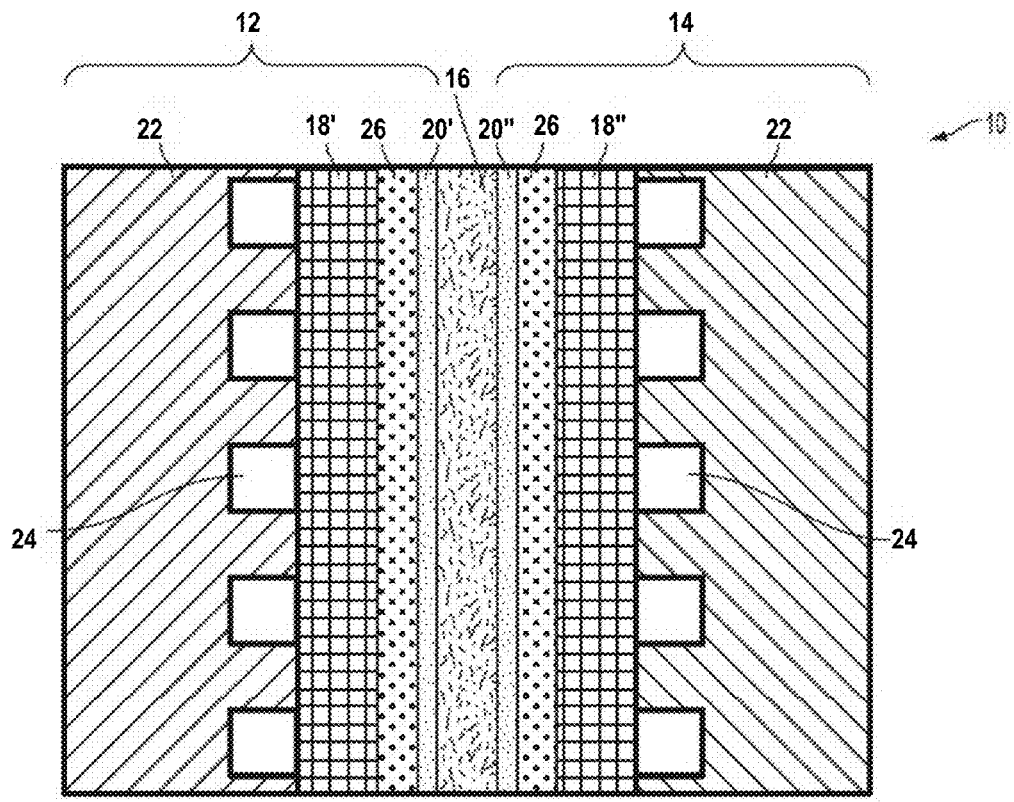
FIG. 1 is a schematic drawing of a proton exchange membrane fuel cell (PEMFC)

With reference to FIG. 1, an example of a PEMFC 10 is illustrated. The PEMFC 10 generally includes a negative electrode (anode) 12 and a positive electrode (cathode) 14, separated by a proton exchange membrane (PEM) 16 (also a polymer electrolyte membrane). The anode 12 and the cathode 14 may each include a gas diffusion layer (GDL) 18, a catalyst layer 20, and a flow field plate 22 which forms a gas channel 24. The GDL 18 may be the same for the anode 12 and the cathode 14. Alternatively, the anode 14 may have a GDL 18' and the cathode 14 may have a different GDL 18". In at least one embodiment, the anode GDL 18' is thinner than the cathode GDL 18" due to reduced gas diffusion requirements of the anode 12 compared to the cathode 14. The catalyst layer 20 may be the same for the anode 12 and the cathode 14, but generally the anode 12 will have a catalyst layer 20' and the cathode 14 will have a different catalyst layer 20". The catalyst layer 20' may facilitate the splitting of hydrogen atoms into hydrogen ions and electrons while the cathode 20" facilitates the reaction of oxygen gas and electrons to form water. In addition, the anode 12 and cathode 14 may each include a microporous layer (MPL) 26 disposed between the GDL 18 and the catalyst layer 20.

Figure 2:
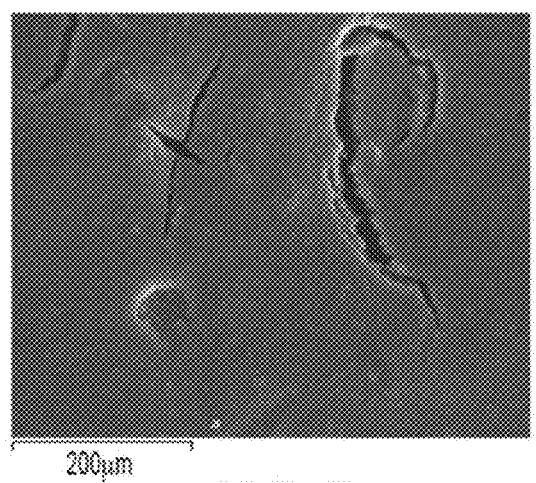
FIG. 2 is a micrograph showing cracks in a conventional microporous layer.

In conventional PEMFCs, water produced in the cathode may be absorbed by the catalyst layer and/or the PEM, or transported in forms of both vapor and liquid water through a GDL to a cathode gas channel, where it is carried away by the gas streams. Conventional GDL materials for PEMFCs are carbon fiber based paper and cloth with a thickness of about 200 μm. These materials are highly porous (having porosities of about 80%) to allow reactant gas transport to the catalyst layer (which generally has a thickness of about 10-15 μm), as well as liquid water transport from the catalyst layer. In order to facilitate the removal of liquid water, GDLs are typically treated to be hydrophobic with a non-wetting polymer such as polytetrafluoroethylene (PTFE, commonly known by the trade name Teflon). An MPL consisting mainly of carbon powder and PTFE particles may be coated to the GDL side facing the catalyst layer to assist mass transport. Conventional GDLs have a primary pore size in the hundreds of microns, compared to conventional MPLs which have a substantially unimodal pore size of less than 1 μm. While the MPL is supposed to assist in mass transport, it has been found that water preferentially moves through cracks in the MPL that are several microns wide, rather than the intended structure of the MPL. An example of such cracks in an MPL is shown in FIG. 2. These cracks are defects in the MPL, which are unintended and are not controlled or controllable in the manufacture of conventional MPLs.

Figure 3:
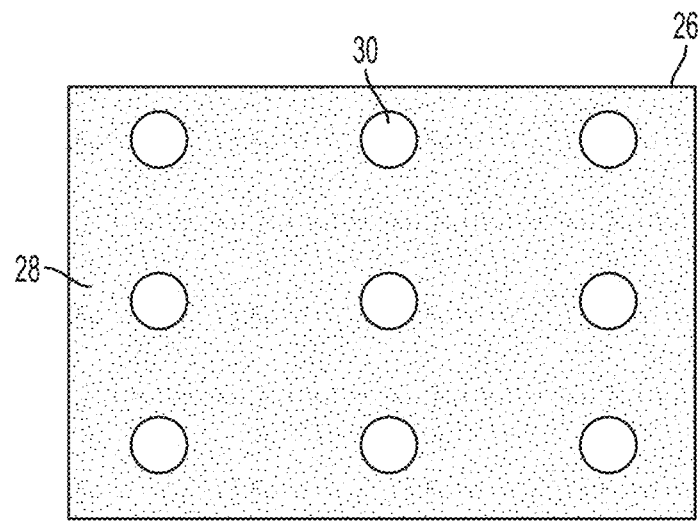
FIG. 3 is a plan view of an embodiment of a microporous layer having a bi-modal pore size distribution.

With reference to FIG. 3, in at least one embodiment, an MPL 26 is shown that increases the liquid flow through the cathode GDL 18 and thus mitigates cathode flooding. The MPL 26 may be formed of electrically conductive particles and a hydrophobic binder, for example, carbon particles and a PTFE binder, respectively. In at least one embodiment, the MPL 26 may have a substantially bi-modal pore size distribution, with a first set of pores 28 and a second set of bores 30. In at least one embodiment, the first set of pores 28 has a diameter of 0.05 to 2.0 μm. In another embodiment, the first set of pores 28 has a diameter of 0.05 to 1.0 μm. In another embodiment, the first set of pores 28 has a diameter of 0.05 to 0.5 μm.

Figure 4:
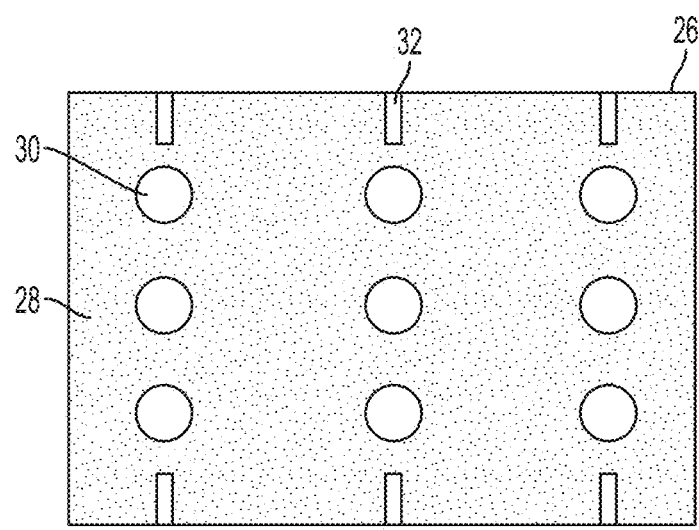
FIG. 4 is a plan view of an embodiment of a microporous layer having multiple bore cross-sections.

In at least one embodiment, the second set of bores 30 extend through the entire thickness of the MPL 26, which, in some embodiments, is about 5 to 75 μm. In another embodiment, the MPL 26 has a thickness of 10 to 60 μm. In another embodiment, the MPL 26 has a thickness of 20 to 50 μm. In other embodiments, the bores 30 extend at least a portion of the entire thickness of the MPL 26. The bores 30 may be formed in any suitable manner, for example by laser perforation. The bores 30 may be cylindrical or substantially cylindrical, however other shapes or cross-sections may be possible, as well. Other suitable bore shapes include, but are not limited to, elliptical and rectangular cross-sections. A combination of different bore shapes may also be used. For example, in an embodiment shown in FIG. 4, a majority of the bores 30 may be substantially cylindrical, but there may be a second set of bores 32 having a high aspect ratio (e.g., an elongate rectangle). The high aspect ratio bores 32 may be located such that they facilitate water transport from areas of the MPL 26 and GDL 18 covered by or adjacent to the plate 22 land (e.g., portion of plate 22 between gas channels 24) to areas that are adjacent to the gas channel 24. Bores 32 thereby prevent water from building up in areas of the MPL 26 and GDL 18 that are not adjacent to the gas channel 24. As illustrated in FIG. 4, the bores 32 are located at the top and bottom of the MPL 26, however, they may be located in any area and may be configured to be adjacent to any, some, or all of the plate 22 lands. In one embodiment, the bores 30, 32 have a diameter/width of 1 to 100 μm. In another embodiment, the bores 30, 32 have a diameter/width of 1 to 50 μm. In another embodiment, the bores 30, 32 have a diameter/width of 5 to 20 μm.

As a result of the hydrophobic binder and the bi-modal pore distribution into relatively small pores 28 and relatively large bores 30, the MPL 26 has improved two-phase mass transport and improved water management. Capillary pressure is one of the main factors in the transport of liquid water in the MPL 26. The relationship between pore size and capillary pressure is described by the Young-Laplace equation, below:

$$P_c = \frac{2\sigma\cos\theta}{r} \qquad \text{Eq. 1}$$

Wherein $P_c$ is capillary pressure, σ is the surface tension of liquid water, θ is the wetting angle of water inside the pore, and r is the radius of the pore. Due to the hydrophobicity of the MPL 26 and capillary pressure, the larger bores 30 are less resistant for water to enter (e.g., less hydrophobic) than the smaller pores 28. As such, liquid water will enter the large bores preferentially to the small pores. Accordingly, in at least one embodiment, liquid water will travel almost exclusively through the bores 30 and leave the smaller pores 28 to transport substantially only gases (e.g., reactant gas to the cathode catalyst layer 20 and water vapor to the cathode gas channel 24).

In at least one embodiment, the diameter (D) of the bores 30 can be chosen or determined by adjusting Eq. 1 to solve for diameter and by inputting the breakthrough capillary pressure of a GDL 18 being used in the PEMFC 10.

$$D = -\frac{4\sigma\cos\theta}{P_{c(GDL)}} \quad \text{Eq. 2}$$

Accordingly, the diameter of the bores 30 of MPL 26 can be tailored to the specific GDL being used in the PEMFC 10. If the anode 12 and cathode 14 have different GDLs 18, then the bores 30 of MPL 26 may be tailored to one GDL or the other, or each MPL 26 could be tailored to the adjacent GDL 18. For example, if a commercially available GDL is used, the breakthrough capillary pressure can be looked up, determined experimentally, or otherwise acquired and the bores 30 can be sized accordingly to provide the most effective and/or efficient water transport. Therefore, the diameter of the bores 30 can be chosen or determined according to scientific and engineering principles, as opposed to a "trial and error" or other non-scientific based approach.

In addition to choosing bore 30 diameters based on scientific principles, the number and pattern of the bores 30 may be done scientifically as well. Assuming a laminar flow of liquid water through the bores 30, the volumetric flow of water through each hole can be determined using the Hagen-Poiseuille equation:

$$Q_{bore} = \frac{\pi r^4 \Delta P_{water}}{8\mu L_{bore}} \quad \text{Eq. 3}$$

Wherein $Q_{bore}$ is the volumetric flow through a single bore 30, r is the bore radius, $\Delta P_{water}$ is the water hydraulic pressure drop across the bore, $\mu$ is the dynamic viscosity, and $L_{bore}$ is the length of the bore, which in at least one embodiment is the MPL thickness. The number of bores (N) may then be determined by dividing the total water flow ($Q_{total}$) through the MPL 26 produced at a certain or predetermined current density at an electrode (e.g. the cathode 14) by the volumetric flow through a single bore $Q_{bore}$:

$$N = \frac{Q_{total}}{Q_{bore}} \quad \text{Eq. 4}$$

Making the appropriate substitutions, Equation 4 can be rewritten as:

$$N = \frac{8\mu L Q_t}{\pi r^4 \Delta P} \quad \text{Eq. 5}$$

For example, for a total water flow equivalent to the water production at 2 A/cm$^2$ at a fuel cell cathode, an areal density of about 10 bores having a 20 µm diameter per cm$^2$ would be needed to transport the produced water. As used herein, "areal density" refers to a number of bores 30 per unit surface area, for example, per cm$^2$. With reference to FIG. 3, if the illustrated embodiment of an MPL 26 had an area of 90 cm$^2$, then the MPL 26 would have an areal density of bores 30 of 10 per cm$^2$. While the number of bores necessary to transport the liquid water within the MPL 26 may be determined according to the above method, water transport may be increased by including additional bores per cm$^2$ above the calculated amount required. The areal density of the MPL 26 may be determined using a multiplier above the required amount. For example, if 10 bores 30 are required per cm$^2$, a multiplier of 40 would mean that an areal density of 400 bores per cm$^2$ is incorporated in the MPL 26. The multiplier may be, for example, from 1 to 100, or from 5 to 50, or from 10 to 40. In at least one embodiment, the areal density of bores 30 per cm$^2$ is from 1 to 500. In another embodiment, the areal density of bores 30 per cm$^2$ is from 50 to 500. In another embodiment, the areal density of bores 30 per cm$^2$ is from 100 to 500. In another embodiment, the areal density of bores 30 per cm$^2$ is about 400.

In at least one embodiment, the bores 30 have a transverse spacing or hole interval therebetween. In some embodiments, the spacing may be uniform such that the bores 30 form a grid-like pattern. The interval may be determined based on the calculated number of bores 30 and areal density. For example, based on the above example of an areal density of about 100, an interval of about 1 mm between bores 30 may be used. In one embodiment, the bores 30 may have a transverse spacing of 0.1 to 5 mm. In another embodiment, the bores 30 may have a transverse spacing of 0.2 to 3 mm. In another embodiment, the bores 30 may have a transverse spacing of 0.3 to 2 mm. In another embodiment, the bores 30 may have a transverse spacing of 0.5 to 1 mm. In another embodiment, the bores 30 may have a transverse spacing of about 0.5 mm.

In at least one embodiment, the bores 30 have a pattern of arrangement. In one embodiment, the bores may be arranged in a square lattice pattern. In another embodiment, the bores may have rhombus lattice distribution. In another embodiment, the bores may have hexagonal lattice distribution. In addition, the areal density may vary or be non-uniform across the length of the MPL 26, for example, having higher bore areal density in the region adjacent to the gas channel 24 exit than the inlet, or vice versa. There may be one, two, three, or more different areal densities of bores 30 along a length of the MPL 26, for example created by laser perforation. In one embodiment, there may be few or no bores 30 on one end of the MPL 26, a larger density at a middle of the MPL 26, and a still larger density on the other end of the MPL 26, thereby creating a gradient of areal densities along the length of the MPL 26. The gradient may be configured such that the areal density of bores 30 is highest in the region adjacent to the exit of the gas channel 24, since this may increase the rate of water removal from the catalyst layer because the gas channel exit region normally has the most water. In addition, other gradients may be used such that the density is highest in the middle region of the MPL 26 and not at the end. There may also be more than three distinct areal densities throughout the length of the MPL 26. Each region of the MPL 26 may have any of the properties disclosed in the above or below embodiments. For example, the bores 30 may be larger in one region than in another or may have a different transverse spacing in one region than in another.

As a result of the scientifically chosen size, number, and pattern of the bores 30, their fraction of the total porosity of the MPL 26 can be reduced to its smallest effective value. In one embodiment, the bores 30 comprise 0.1 to 10 percent of the total porosity of the MPL 26. In another embodiment, the bores 30 comprise 0.1 to 5 percent of the total porosity of the MPL 26. In another embodiment, the bores 30 comprise 0.1 to 2.5 percent of the total porosity of the MPL 26. In another embodiment, the bores 30 comprise 0.5 to 1.5 percent of the total porosity of the MPL 26. In another embodiment, the bores 30 comprise about 1 percent of the total porosity of the MPL 26.

Having a relatively low porosity contributed by the bores 30 causes the MPL 26 to maintain its gas permeability and oxygen effective diffusion. The engineered MPL 26 reduces the resistance for liquid water to enter the MPL 26 and GDL 18 and enhances the liquid water transport rates. These properties lead to more robust operation under normal operating conditions, as well as more extreme conditions such as low temperatures. Flooding of the cathode 14 is mitigated or eliminated and performance, durability, and cost effectiveness of the fuel cell as a whole are improved. In addition, the currently used GDLs can still be used, which have high electrical and thermal conductivity, as well as appropriate mechanical properties. Since the MPL 26 is designed based on engineering and scientific principles, it yields more consistent, reproducible, and predictable results than those currently available.

EXAMPLE

The fuel cell performance (i.e., polarization curve) of a PEMFC provided with several embodiments of MPLs 26 was evaluated in a single cell with an active area of 48.4 cm$^2$. For all of the tests, hydrogen was supplied to the anode and air was supplied to the cathode. Hydrogen and air flow rates were fixed at 2 L/min and 12 L/min, respectively. The cell temperature was varied in the range of 40-90° C. The anode inlet relative humidity (RH) was fixed at 100% while the cathode RH varied between 30% and 100%. Under these conditions, the cell voltage was measured at a current density of 2.5 A/cm$^2$. The results are shown below in Table 1. The PEMFCs provided with the engineered MPLs had excellent fuel cell performance, with a higher voltage at a current density of 2.5 A/cm$^2$ than the PEMFC provided with the control MPL (a conventional MPL).

This application is related to U.S. Pat. No. 8,945,790, filed Mar. 15, 2013.

While certain embodiments have been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A fuel-cell microporous layer comprising:
   a layer of carbon and binder between catalyst and gas diffusion layers of a fuel-cell electrode, the microporous layer having a bi-modal pore distribution including:
   a plurality of pores with a diameter of 0.05-1.0 µm; and
   a plurality of cylindrical through-bores extending through an entire thickness of the microporous layer and having a diameter of 1-50 µm, the plurality of through-bores having an areal density of about 400 bores per cm$^2$ and comprising 0.1-5 percent of a total porosity of the microporous layer;
   wherein the pores are more hydrophobic than the through-bores.

2. The microporous layer of claim 1, wherein the plurality of cylindrical through-bores have a transverse spacing therebetween of 0.2-3 mm.

3. The microporous layer of claim 1, wherein the plurality of cylindrical through-bores have a diameter of about 20 µm.

4. The microporous layer of claim 1, wherein the plurality of cylindrical through-bores have a diameter of about 40 µm.

TABLE 1

MPLs having various bore diameters and areal densities were tested and compared to a conventional MPL as a control.

| MPL bore diameter and areal density | Total areal fraction of bores (%) | Cell voltage at 2.5 A/cm$^2$ (V) | | | |
|---|---|---|---|---|---|
| | | $T_{cell}$ = 43° C., RH = 100% (an)/100% (ca) | $T_{cell}$ = 60° C., RH = 100% (an)/100% (ca) | $T_{cell}$ = 90° C., RH = 100% (an)/100% (ca) | $T_{cell}$ = 90° C., RH = 100% (an)/30% (ca) |
| 100 µm, 100 per cm$^2$ | 0.79 | 0.35 | 0.45 | 0.45 | 0.37 |
| 100 µm, 400 per cm$^2$ | 3.14 | 0.43 | 0.49 | 0.47 | 0.37 |
| 40 µm, 100 per cm$^2$ | 0.12 | 0.38 | 0.49 | 0.47 | 0.39 |
| 40 µm, 400 per cm$^2$ | 0.50 | 0.48 | 0.52 | 0.53 | 0.42 |
| Control sample | | 0.24 | 0.43 | 0.46 | 0.37 |

5. The microporous layer of claim 1, wherein the diameter of the through-bores is a function of a capillary pressure of the gas diffusion layer.

6. The microporous layer of claim 1, wherein the microporous layer further has defined therein a plurality of rectangular through-bores having a width of 1-50 μm and extending through an entire thickness of the microporous layer, the cylindrical through-bores and the rectangular through-bores combined comprising 0.1-5 percent of a total porosity of the microporous layer.

7. The microporous layer of claim 1, wherein the plurality of pores has a diameter of 0.05-0.5 μm; and the plurality of cylindrical through-bores comprises 0.5-1.5 percent of the total porosity of the microporous layer.

8. A fuel cell comprising:
- a positive electrode including a first gas diffusion layer and a first catalyst layer;
- a negative electrode including a second gas diffusion layer and a second catalyst layer;
- a proton exchange membrane (PEM) disposed between the positive and negative electrodes; and
- a microporous layer of carbon and binder disposed between at least one of the first gas diffusion layer and the first catalyst layer and the second gas diffusion layer and the second catalyst layer, the microporous layer having defined therein a bi-modal pore distribution including:
- a plurality of pores with a diameter of 0.05-1.0 μm and;
- a plurality of cylindrical through-bores extending through an entire thickness of the microporous layer and having a diameter of 1 to 50 μm, the plurality of cylindrical through-bores having an areal density of about 400 bores per cm² and comprising 0.1-5 percent of a total porosity of the microporous layer;
- wherein the pores are more hydrophobic than the through-bores.

9. The fuel cell of claim 8, wherein a first microporous layer is disposed between the first gas diffusion layer and the first catalyst layer and a second microporous layer is disposed between the second gas diffusion layer and the second catalyst layer, the first and second microporous layers both having defined therein the bi-modal pore distribution.

10. The fuel cell of claim 8, wherein the microporous layer further has defined therein a plurality of rectangular through-bores extending through an entire thickness of the microporous layer and arranged such that they are adjacent to lands of a flow field plate of the positive or negative electrode.

11. The fuel cell of claim 8, wherein the plurality of cylindrical through-bores have a transverse spacing therebetween of 0.2 to 3 mm.

12. The fuel cell of claim 8, wherein the plurality of cylindrical through-bores have a diameter of about 20 μm.

13. The fuel cell of claim 8, wherein the plurality of cylindrical through-bores have a diameter of about 40 μm.

14. The fuel cell of claim 8, wherein the diameter of the cylindrical through-bores is a function of a capillary pressure of one of the first gas diffusion layer and the second gas diffusion layer.

15. The fuel cell of claim 8, wherein the diameter of the cylindrical through-bores is a function of a capillary pressure of the second gas diffusion layer.

16. The fuel cell of claim 8, wherein the microporous layer further has defined therein a plurality of rectangular through-bores having a width of 1-50 μm and extending through an entire thickness of the microporous layer, the cylindrical through-bores and the rectangular through-bores combined comprising 0.1-5 percent of a total porosity of the microporous layer.

17. The fuel cell of claim 16, wherein the plurality of pores has a diameter of 0.05 to 0.5 μm; and the plurality of cylindrical through-bores and the plurality of rectangular through-bores comprise 0.5-1.5 percent of the total porosity of the microporous layer.

18. A fuel-cell microporous layer comprising:
- a layer of carbon and binder between catalyst and gas diffusion layers of a fuel-cell electrode, the microporous layer having a bi-modal pore distribution including:
- multiple pores with a diameter of 0.05-1.0 μm; and
- multiple cylindrical through-bores extending through an entire thickness of the microporous layer, having a diameter of about 40 μm, having an areal density of about 400 bores per cm², and being less hydrophobic than the pores.

19. The microporous layer of claim 18, wherein the microporous layer further has defined therein a plurality of rectangular through-bores having a width of 1-50 μm and extending through an entire thickness of the microporous layer, the cylindrical through-bores and the rectangular through-bores combined comprising 0.1-5 percent of a total porosity of the microporous layer.

* * * * *